2,861,882
PROCESS FOR REDUCING NIOBIUM OXIDES TO METALLIC STATE

Foord von Bichowsky, Wilmington, Del.

No Drawing. Application November 12, 1957
Serial No. 695,515

6 Claims. (Cl. 75—84)

The present invention concerns an improved process for the reduction of niobium oxygen compounds, that is the pentoxide, dioxide, oxide and/or sub-oxide to the metallic state by the employment of hydrogen in conjunction with certain novel means.

It is known that niobium pentoxide in the presence of not less than 30% by weight of pulverulent nickel when treated, in various kinds of furnaces and at above red heat, with pure hydrogen is reduced to the metallic state. It also is known, in the absence of nickel, that the reaction apparently goes stepwise but at about 1100° C. only to a lower oxide of niobium with the formation of water vapor, as follows:

$$Nb_2O_5 + H_2 = 2NbO_2 + H_2O$$

I have now discovered, if the cited known methods and/or others are carried out in the presence of a catalytic agent or agents, that the above proportions of added nickel may be diminished greatly and/or it even may be present in such a form as to be readily separable from the resulting niobium powder by physical means, for example, by screening and/or magnetically.

These surprising and commercially valuable results are obtained through the employment of a small amount of a compound or compounds of a metal of the alkali metal group, i. e. lithium, sodium, potassium, rubidium and cesium. The last two members of that series, because of their cost, I use less frequently but they are not excluded in this process. The above alkali metal substances also may contain non-metallic elements, for example, oxygen, carbon and/or hydrogen and/or a metallic element, e. g. niobium or calcium. When employing such compounds it often is desirable to add or to have present a small amount of a substance which by its removal during the heating and/or reduction of the niobium oxygen compound with hydrogen will leave behind a permeable reducible mass. Such an aerating and/or spacing material may be, for example, carbon in one of its various forms or a non-agglutinative organic material, e. g. an organic acid say tartaric acid or the alkali and/or alkaline earth metal salts thereof. Here the alkaline earth metal compound can be, for example, calcium tartrate, acetate or carbonate which may serve as a spacer or an inhibitor of cohesion between the niobium produced and any added metal such as nickel. If desired the calcium carbonate may be employed in company with sodium carbonate simply by saturating soda lime with carbon dioxide gas.

The cited discoveries have their origin in the following laboratory observations. I noted when an intimate mixture, containing approximately 96% of niobium pentoxide and 2% of sodium carbonate together with 2% of lampblack, all by weight, was placed in a metal boat of sheet nickel and heated in a stainless steel tube in the presence of a current of purified hydrogen for 5 hours at 1050° C. and under a positive pressure of about 25 mm. of Hg and thereafter was allowed to cool quickly in the tube and in an inert atmosphere, that the cooled charge, where it was in contact with the bottom of the boat had been reduced to silvery spots of metal but the boat itself was unattacked.

In another experiment run under identical conditions but where the ground mixture contained by weight 85% of niobium pentoxide, 11% of nickel as the oxide ($Ni_3O_4$), 2% of sodium carbonate and 2% lampblack the efficiency of reduction was surprisingly high.

The extension of these laboratory observations to practical application may be illustrated by the two following examples:

Example 1

There were ground together for 2 hours in a small ball mill, with enough mineral spirits to form a thin slurry, 10.0 g. pure niobium pentoxide
1.4 g. nickel oxide ($Ni_2O_3$)
0.6 g. lithium carbonate
0.4 g. lampblack.

The resulting slurry was poured onto a suction filter and the filter cake placed in a large nickel combustion boat and dried. The boat was inserted into a furnace made from a piece of stainless steel pipe or of other material resistant to alkali fumes and heated, while displacing the air with nitrogen, to about 500° C. whereupon the nitrogen was replaced by highly purified hydrogen and the temperature of the furnace was raised to about 1075° C. The flow of hydrogen was kept up until the gas leaving the furnace was free of water vapor. This usually required about 24 hours. Then the tube furnace was cooled rapidly to room temperature, the hydrogen being displaced by pure argon during cooling to prevent the formation of any niobium hydride. The resulting niobium powder in the boat plus the metallic nickel then present could be compacted into shapes by pressing or else the nickel could be removed from the powder by known means. The metal product after the removal of any entrained catalyst was very pure and readily workable probably for the reason that if any nitride nitrogen ever had been present in the metal it likely was removed as a volatile cyanide through the combined action of the alkali metal carbonate and traces of residual carbon.

When the above experiment was carried out in accord with the procedure as given in Example 1 of my U. S. Patent No. 2,761,776 the run took longer, i. e. 30 hours and the end product was not as brilliant in appearance.

Example 2

10.0 g. pure niobium pentoxide
0.7 g. sodium carbonate
0.8 g. calcium carbonate were dry ground for an hour and the mixture then moistened and dried to a cake. This cake was broken up so that it passed through a 20 mesh screen. The granulated powder thereafter was transferred to a vertical nickel tube with an internal diameter of about ¾ inch which tube contained, at the lower part of its heatable zone, a plug of fine nickel screen. The air within that upright tube was displaced by nitrogen introduced below the porous plug of nickel screen and when the air was all driven out the nitrogen was replaced by hydrogen flowing upward at such a rate that the layer of niobium oxide mixture while undergoing heating was kept in gentle agitation or bubbling so that the charge came into very frequent and intimate contact with the hot nickel tube and screen. The tube was heated to and kept at an operating temperature of about 1050° C., the rate of hydrogen ingress being adjusted to compensate for changes in its viscosity and density on heating and for any alterations in the character of the bed.

At the end of about 30 hours the reduction was complete. The hydrogen thereupon was displaced by nitrogen-free argon and then cooled to room temperature while the bed still was under agitation. The cold niobium metal powder was removed from the internally uneffected furnace tube and the calcium oxide extender and any residual sodium material were leached away, for example, by a diluted mineral or organic acid, e. g. nitric or acetic acid and then washed acid free and dried.

Where a nickel or nickel lined tube is not available for the furnace some nickel shot, e. g. of about 10 mesh may be added to the charge and at the completion of the run these may be removed by screening. The amount and/or size of shot added depends upon dimensional factors and is best determined by experiment but in any event the use of shot avoids the formation of such alloys as can form in the presence of compacted mixtures of excess, very finely divided nickel. In the place of the calcium carbonate or magnesium carbonate, carbonated soda lime may be employed in equivalent amount.

In the preceding examples lithium carbonate and sodium carbonate have been used as catalysts but similar potassium compounds may be employed especially in the form of a comparable amount of the hexaniobate.

In this connection it should be noted that I have found a definite but wide limit as to the amount of alkali metal compound and/or compounds that may be added. If too much be incorporated the reaction mass tends to fuse and then is either no longer as permeable to the reducing action of hydrogen or else the mass becomes so sticky when hot that a bubbling effect is nullified. For those reasons I prefer to add the alkali material in an amount between 0.1% and 10% by weight of the niobium oxide or oxides used. In some cases there is the possibility that the alkali metal or compound may be removed from the reaction zone by volatilization but if this is suspected an ignition of the exciting hydrogen will show by the color of the flame whether the alkali is fuming off and if this fuming is excessive then the temperature can be lowered slightly or the rate of hydrogen flow lowered or both. If the rate of hydrogen flow be so high that the reduction efficiency is low then it can be advisable to recycle the exit gas after careful removal of the contained water vapor.

The examples specify the use of pure niobium oxides but the commercial products, which may contain up to say 5% of associated tantalum oxide are not to be taken as excluded from the scope of the process.

Having now described my invention and some methods for carrying it out, which methods are illustrative and are not to be considered as restrictive, what I claim is:

1. Process for reducing niobium oxides to the metallic state which comprises the steps consisting in heating a niobium oxygen compound from the group consisting of the pentoxide, dioxide, oxide and sub-oxide, together with an alkali metal compound selected from the group consisting of the carbonates, oxide, hydroxide, niobate and soda-lime in an amount not exceeding 10% by weight of the niobium oxide together with an amount of a spacer material selected from the group consisting of carbon, calcium carbonate, magnesium carbonate, calcium tartrate and acetate, not exceeding 10% by weight of the niobium oxide, all the ingredients being in contact with a nickelous material from the group consisting of nickel, nickel sesquioxide and nickelo-nickelic oxide and in permeable form while in a current of hydrogen at above red heat in a reducing furnace with the exclusion of nitrogen and oxygen until the reduction is completed, then cooling the reduced product under inert conditions and separating the niobium metal containing product.

2. Process for reducing niobium oxides to the metallic state which comprises the steps consisting in heating a niobium oxygen compound from the group consisting of the pentoxide, dioxide, oxide, and sub-oxide, together with an alkali metal carbonate in an amount not exceeding 10% by weight of the niobium oxygen compound incorporated with an amount of carbon whose quantity does not exceed 10% by weight of the niobium oxide all the ingredients in permeable form being in contact with nickel while in a current of hydrogen at about 1100° C. in a reducing furnace while excluding nitrogen and oxygen until the reduction is completed and then cooling the reduced metallized product under inert conditions and comprising the final step of removing the residuum of undesired ingredients.

3. Process for reducing niobium oxides to the metallic state which comprises the steps consisting in heating a niobium oxygen compound from the group consisting of the pentoxide, dioxide, oxide, and sub-oxide together with lithium carbonate in amount not exceeding 10% by weight of the niobium oxide together with calcium carbonate in an amount not exceeding 10% by weight of the niobium oxide in a current of hydrogen while in contact with nickel and in permeable form in a furnace to about 1100° C. while excluding nitrogen and oxygen until the reduction is completed and then cooling the reduced product to room temperature under inert conditions with the final step of extracting the finished product.

4. Process for reducing niobium oxides to the metallic state which comprises the steps consisting in heating a niobium oxygen compound from the group consisting of the pentoxide, dioxide, oxide and sub-oxide, incorporated as permeable grains with sodium carbonate and calcium carbonate in amounts each not exceeding 10% by weight of the pentoxide in a current of hydrogen while in intermittent contact with nickel within a furnace at about 1100° C. while excluding atmospheric contaminants until reduction is completed and then cooling the reduced product under inert conditions to room temperature and removing the residuum of catalytic and spacer material by means of a weak acid leach.

5. Process for reducing niobium oxides to the metallic state which comprises the steps consisting in heating a niobium oxygen compound, specifically the pentoxide incorporated as permeable grains with sodium carbonate and calcium carbonate in amounts each not exceeding 10% by weight of the pentoxide in a current of hydrogen while in intermittent contact with coarser nickel particles and while within a furnace to about 1050° C. while excluding oxygen and nitrogen until the reduction is completed and cooling the reduced mixture under inert conditions to room temperature, then screening out the added coarse nickel particles and eliminating the residiuum of alkali and spacer material from the niobium powder by means of a weak acid leach.

6. Process for reducing niobium oxides to the metallic state which comprises the steps consisting in heating niobium pentoxide, incorporated as permeable grains with carbonated soda-lime whose separate content of sodium carbonate and calcium carbonate each do not exceed 10% by weight of the niobium oxide, in a current of hydrogen while in rapid intermittent contact with metallic nickel, present as a lining within a vertical reduction furnace, to about 1050° C. while excluding oxygen and nitrogen until the reduction is complete and cooling the reduced product under inert conditions to room temperature, removing the residuum of alkali and spacer material from the metalliferous grains by means of a weak acid leach and washing and drying the pure niobium obtained.

References Cited in the file of this patent

UNITED STATES PATENTS 2,761,776    Bichowsky _____ Sept. 4, 1956